United States Patent
Chaudhry et al.

(10) Patent No.: US 8,819,713 B1
(45) Date of Patent: Aug. 26, 2014

(54) METHOD AND SYSTEM FOR COLLECTING CLIENT USAGE DATA FOR A USER DEVICE

(75) Inventors: Kapil Chaudhry, Cerritos, CA (US); Jin H. Chung, Fullerton, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 189 days.

(21) Appl. No.: 12/957,221

(22) Filed: Nov. 30, 2010

(51) Int. Cl.
*H04N 7/16* (2011.01)
*H04N 5/445* (2011.01)

(52) U.S. Cl.
USPC .................... 725/13; 725/14; 725/20; 725/46

(58) Field of Classification Search
USPC ...................... 725/44, 46, 13–14, 20; 707/711
See application file for complete search history.

(56) References Cited

U.S. PATENT DOCUMENTS

| | | | |
|---|---|---|---|
| 7,552,460 B2 * | 6/2009 | Goldman | 725/44 |
| 7,660,755 B2 * | 2/2010 | Amato et al. | 705/34 |
| 2004/0138786 A1 * | 7/2004 | Blackett et al. | 700/295 |
| 2008/0215355 A1 * | 9/2008 | Herring et al. | 705/1 |
| 2012/0030191 A1 * | 2/2012 | Zwicky et al. | 707/711 |

* cited by examiner

*Primary Examiner* — Jason J Chung
*Assistant Examiner* — Sumaiya A Chowdhury (57) ABSTRACT

A system and method for collecting usage data from a first user device and a second user device includes a first module receiving a first device action signal from the first user device having first device usage data associated therewith. The first module receives a second device action signal from second user device having second device usage data associated therewith and stores the storing the first device usage data and the second device usage data in the usage queue. A usage data collector is in communication with the first module and receives the first usage data and the second usage data to a usage data collector. A central data storage site receives the usage data from the usage data collector.

22 Claims, 5 Drawing Sheets

METHOD AND SYSTEM FOR COLLECTING CLIENT USAGE DATA FOR A USER DEVICE

TECHNICAL FIELD

The present disclosure relates generally to communication systems, and more particularly, to a method and system for determining usage data for a user device.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Broadcast television channels and other internal programs are provided by the primary service provider. Another service provided by a primary service provider is providing program guide data which is used by a user device to display a grid guide on a display associated with the user device.

Various services may be offered by a service provider. Remote booking, guide searching and other services may be provided. Usage of various services cannot always be predicted. Users and groups of users tend to perform similar requests and trends develop over time. Improving various service provided by a service provider is a desirable goal.

SUMMARY

The present disclosure provides a system and method for collecting user data from a plurality of user devices when various services are used so that other systems and services provided by the service provider may be improved.

In one aspect of the disclosure, a method includes generating first device action signal at a first user device having first device usage data associated therewith, generating second device action signal at a second user device having second device usage data associated therewith, communicating the first device usage data and the second device usage data to a usage data queue, storing the first device usage data and the second device usage data in the usage queue, thereafter, communicating the first usage data and the second usage data to a usage data collector and communicating the usage data to a central data storage site from the usage data collector.

In another aspect of the disclosure, a system and method for collecting usage data from a first user device and a second user device includes a first module receiving a first device action signal from the first user device having first device usage data associated therewith. The first module receives a second device action signal from the second user device having second device usage data associated therewith and stores the storing the first device usage data and the second device usage data in the usage queue. A usage data collector is in communication with the first module and receives the first usage data and the second usage data to a usage data collector. A central data storage site receives the usage data from the usage data collector.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Figure 1:
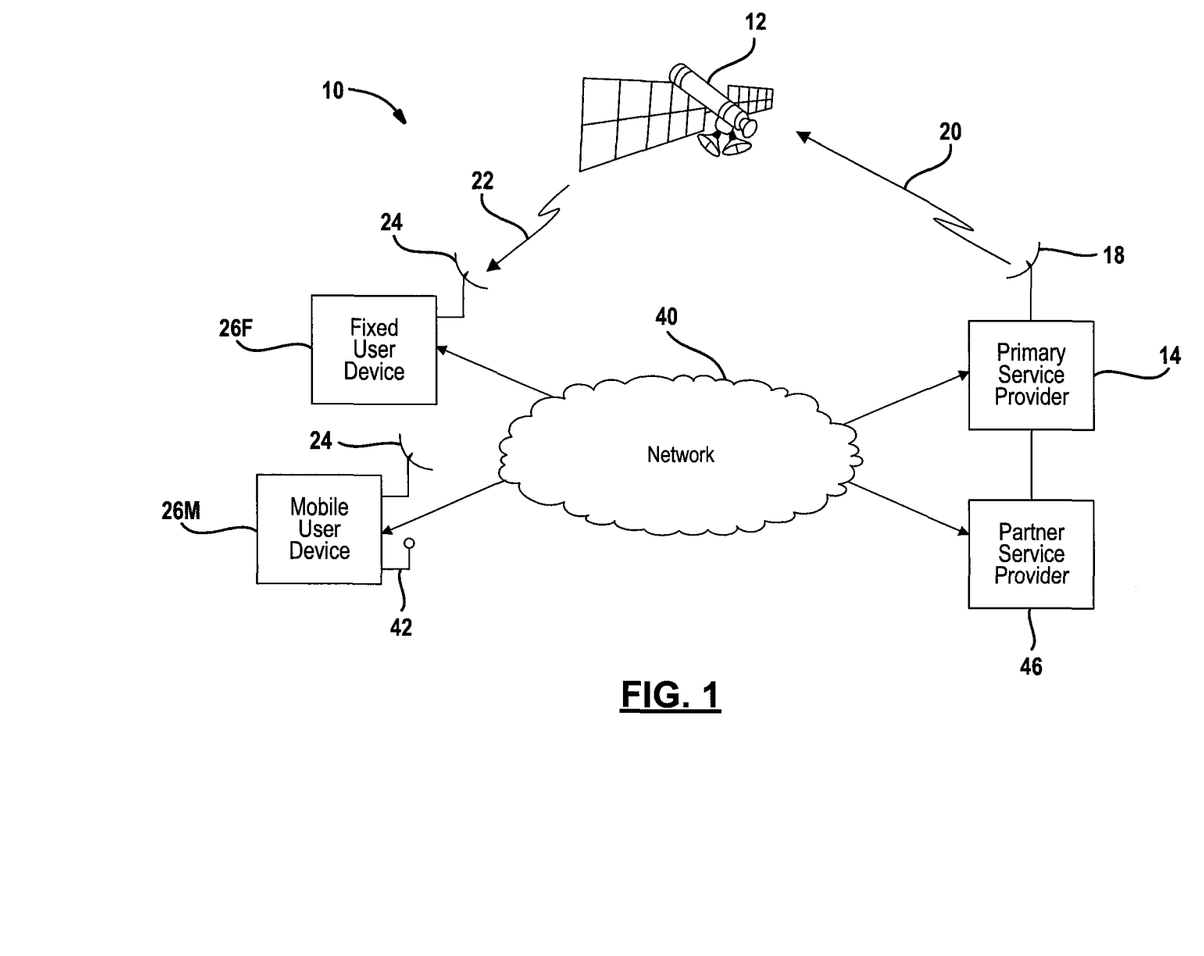
FIG. 1 is a block diagrammatic view of a satellite communication system according to the present disclosure.

Referring now to FIG. 1, a satellite television broadcast system 10 is illustrated. The satellite television broadcast system 10 is illustrated by way of example. However, the present disclosure is not so limited as mentioned above. The television broadcast system 10 includes a satellite 12 that receives content or programming from a primary service provider 14. More specifically, the primary service provider 14 generates uplink signals 20 corresponding to content through an uplink antenna 18. As mentioned above the content may be various types of content including but not limited to live content, recorded content, pay-per-view content and on-demand content. The uplink signals 20 may be television signals and more specifically digital television signals. The uplink signals may also be data including but not limited to interactive television data and program guide data. The uplink antenna 18 communicates the uplink signals 20 to the satellite 12 which in turn generates downlink signals 22. The downlink signals 22 are communicated to a receiving antenna 24 on a fixed user device 26F or mobile user device 26M, which will be collectively referred to as the user device 26. Although only one of each type of user device 26 is illustrated, several user devices may be provided in the system 10.

The uplink signals 20 and downlink signals 22 may be referred to as communication signals. Communication signals are wireless communication signals and may include various types of entertainment content such as movies, programs, video clips, data, traffic, weather, hazardous material warnings, advertising material, guide data and the like.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired (optical or copper), wirelessly or a combination of both. For example, the user device 26 may include a wireless antenna 42 for communicating with the network 40 through a router, cell tower or the like. The network 40 may also be an intranet.

The fixed user device 26F may include a satellite television receiver, set top box or a digital video recorder. The satellite television receiver may also be referred to as an integrated receiver decoder. Of course, other types of user devices may be used such as a cable television set top box. The mobile device 26M may include various devices including but not limited to a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The user device may generate a device action signal that may be communicated to the primary service provider 14 through the network 40. The device action signal may be a request for content, a request for data such as program guide data, statistical data, remote booking event request, a receiver request, showcard asset request, channel event request, schedule event request, simple channel listing event request, league event request, a search request, a field search, a set-up event, a data list, an authentication event, a look-up account information event, a highlight request event, a sporting supercast event, a common authorization event, or a clean-up event. A request remote booking event request is a request for remotely scheduling a recording on a storage device located remotely from the requesting device. A get program detail event is an event for requesting further details on a particular program. A get receiver's event request allows a user device to retrieve information about a remotely located receiver. A get showcard assets event provides further data such as images for a given show program or movie. A get simple channel event request provides channel data for a particular date for a particular channel. A get simple schedules event request allows a simple schedule to be obtained for a given channel. A get simple listings flex event may provide channel, schedule and program data for a given channel date and range. A get simple listing league event may provide listings such as channel, schedule and program data for a given sports league or other type of league. A field search request event may provide key word searching for searching through program titles, program categories, program credits and a channel short name. A field search request event may provide various inputs such as a search key word along with various fields through which to run a search. A field search request with authorization and black-out event may provide a search similar to the field request search with the option of including authorization codes and blackout codes. A setup event may be used to create new user accounts for accessing program guide services. An authentication event may provide a check of the validity of credentials of a user device. A look-up account information event allows a user device to look up an account and retrieve various data for a specific subscription. A highlight request event returns metadata for various types of highlight data for a sporting event. A supercast authentication event may be used for determining a subscriber status for a particular subscription. A common authorization event may provide authorization for entitlement to a different version of an already purchased content. This may, for example, be authorization for a standard definition version of a high-definition purchase suitable for display upon a mobile device.

The various requests or request signals from the user devices may include various data. The data, for example, may include a site identifier that is used for authentication. The site identifier identifies the site by a reference number or name. All the identifiers set forth herein may provide a name or number or combination thereof. Other types of data from the user device may contain a site user identifier which is the site user identifier that is used for authentication. A server name that is running the particular application, a port number for a server, and a method accessed code may also be provided. An IP address of the user device, an accessed time, an account identifier, and a client's local zip code may be provided for the various event signals. Specific event requests may also be incorporated into the metadata such as a channel identifier, a start time, a program reference identifier, an access card identifier, and an HTTP header may be provided for a remote booking event. For a program detail event or a showcard assets event, the data may include a program reference identifier for the show of interest. For a get receiver's event, the data from the site identifier through the zip code may be the only data required. For a get simple channels event, a start time and an end time for the desired listings may also be included within the data. The start time and the end time may also be provided for a get simple schedules event or a get simples listing flex event. For a league event, the league abbreviation or code may also be provided as well as a start time and an end time. An account type may also be provided for a league event to insure that the subscriber is subscribed to the particular service included within the listings. A search request event may also provide a search word that the client uses to search a program.

For a field search event request, a search word identifier, a search field and a search operation may be provided. As mentioned above, the search field request may also include authorization and blackout events. A setup event may also include an accessed time and a status. A method name and number of successful validations may be included in an authentication event. A lookup account event may include flags for the various services included within the event. Many services may include subservices that may be separately subscribed to and thus identifiers for the separate subscription portions may be prompted. A highlight request event may include a provider name, a product type and a count of the number of highlights to be returned.

A common authorization event may also include a station identifier, a program identifier and an accessed time. Thus, as is described above, various types of the usage data may be provided depending upon the action or request desired.

A partner service provider 46 may also be or may be in communication with the primary service provider 14. The partner service provider 80 may be used for providing various types of data including streaming content or recorded content. The partner service provider 46 may also be used for providing other types of data to the user device 26. The partner service provider 46 may provide the data through the primary service provider 14 or directly to the user device 26 through the network 40. Various types of data such as metadata may also be provided through the partner service provider 46.

Figure 2:
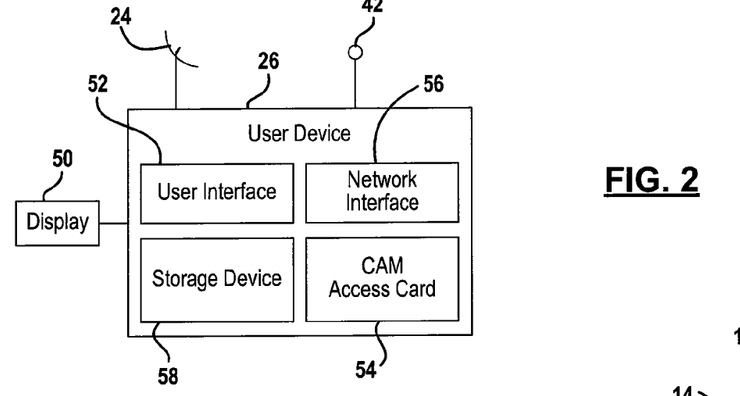
FIG. 2 is a block diagrammatic view of a user device according to the present disclosure.

Referring now to FIG. 2, the user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a cellular phone system interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

Figure 3:
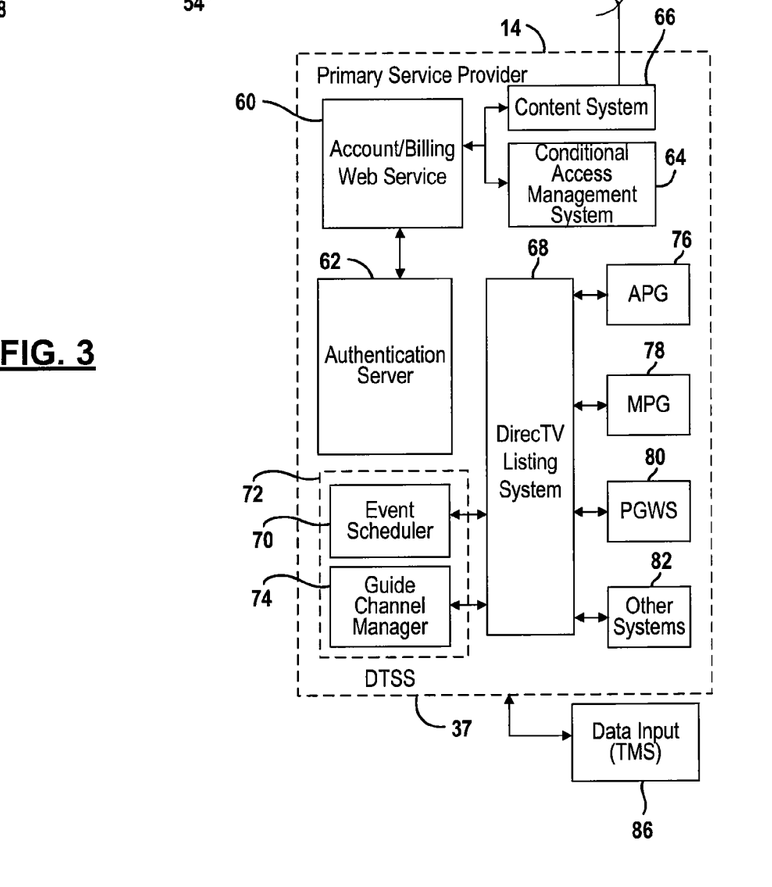
FIG. 3 is a block diagrammatic view of a primary service provider according to the present disclosure.

Referring now to FIG. 3, the primary service provider 14 may also include an account/billing web service 60 and an authentication server 62. The authentication server 62 may include an authentication server for generating and validating user devices using eTokens or other processes.

The primary service provider 14 may also include a conditional access management system 64. The conditional access management system 64 may be used to grant conditional access to various programming as well as provide recording commands to the user device 26 as will be described below. The conditional access management system 64 may be used to grant programming to various content within a content system 66. The content system 66 may provide various types of content such as taped or recorded content as well as live streaming content to the user device 26. The content accessed may be subscriber content.

The primary service provider 14 may also include a DIRECTV® listing system (DLS) 68. The listing system 68 may be in communication with an event scheduler 70, which may also be referred to or be a part of a DIRECTV® traffic and scheduling system (DTSS) 72. The event scheduler 70 may be stand alone or a module within the DTSS 72. The DIRECTV® listing system 68 may also be in communication with a guide channel manager (GCM) 74 may also be stand alone or part of the DTSS 72. The listing system 68 may also be in communication with an advance program guide module 76, a program guide generator 78, a program guide web service 80 and other systems 82. The interaction of the DIRECTV® listing system 36 and the various modules 70-82 are used to generate program guide data, links and metadata associated therewith.

An external data input 86, such as Times Media Service (TMS), may be used for receiving various data or metadata regarding programming. Times Media Service 86 is just one example of an external data service. The external data input 38 may provide channels, programs, metadata, graphics, posters, showcards and schedules as an input to the listing system 36. The external data input 86 may provide various types and formats of data. A data stream may be provided with various types of information regarding programming.

The event scheduler 70 is used to provide various data such as the channel, schedule, channel mapping, program associated data (PAD), channel information, program information packets (PIPs). The event scheduler 70 may be referred to as an internal data source since some of the data may be for internal programming provide by the primary service provider such as pay-per-view and the like. The data provided by the event scheduler 70 will support searches in various fields of stored information relative to available programming. For example, the data from the event scheduler 70 may be searchable using keywords in fields such as but not limited to Program Reference Identifier, Program Title, Program Category, Program Credits Channel Short Name or in one or more specific fields such as but not limited to Program Title, Episode Title, Program Description, Program Category, Program Credits and Air Date, Run Length, Rating, Channel Short Name. The searching may be performed for linear content as well as non-linear content.

The event scheduler 70 may also be used to provide broadcast operation channel attributes and broadcast operation channel to guide channel mapping. The mapping is used to link various channels to the guide channels and thus the channel viewers may use to view the particular programming. When changes are made in the programs and schedules or the mapping, the event scheduler may notify the listing system 68. For pay-per-view programming, the DIRECTV® listing system may request further program information from the external data input 86.

Guide channel data is also provided by the guide channel manager 74. The guide channel manager 74 may provide guide channel attributes to the DIRECTV® listing system 68. Examples of data the guide channel manager 74 may provide include channel data including local channel configuration data, the content channel identifier, a long name of the channel, a channel category, a logo index, a network affiliation, a channel URL, an HD/SD hide channel flag, an audio identifier, a minor channel identifier, a PIP channel number, and the like.

The information or the data provided by the event scheduler 70, the guide channel manager 74 and the external data input 86 is used to form the entries in a listing database. The listing data may be used by several systems such as the advance program guide system 76, the program guide generator (MPG) 78 and the program guide web service 80. Other systems 82 may also use the listing data from the listing database.

The program guide web service 80E may be used to generate program guide data and information regarding various programming that is available. The program guide web service 80, as will be described below, may generate custom programming guide information based upon the subscription to which a user is subscribed. The custom guide information may be formatted for a particular consumer. The program guide web service 80 may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide.

The program guide web service 80 may generate program guide data for both linear and non-linear content Linear content are television shows broadcasted at a particular time and a particular channel. Network television programming is an example. Non-linear content is programming that is not tied to a particular time such as on-demand content that can be requested at the user's discretion.

Figure 4:
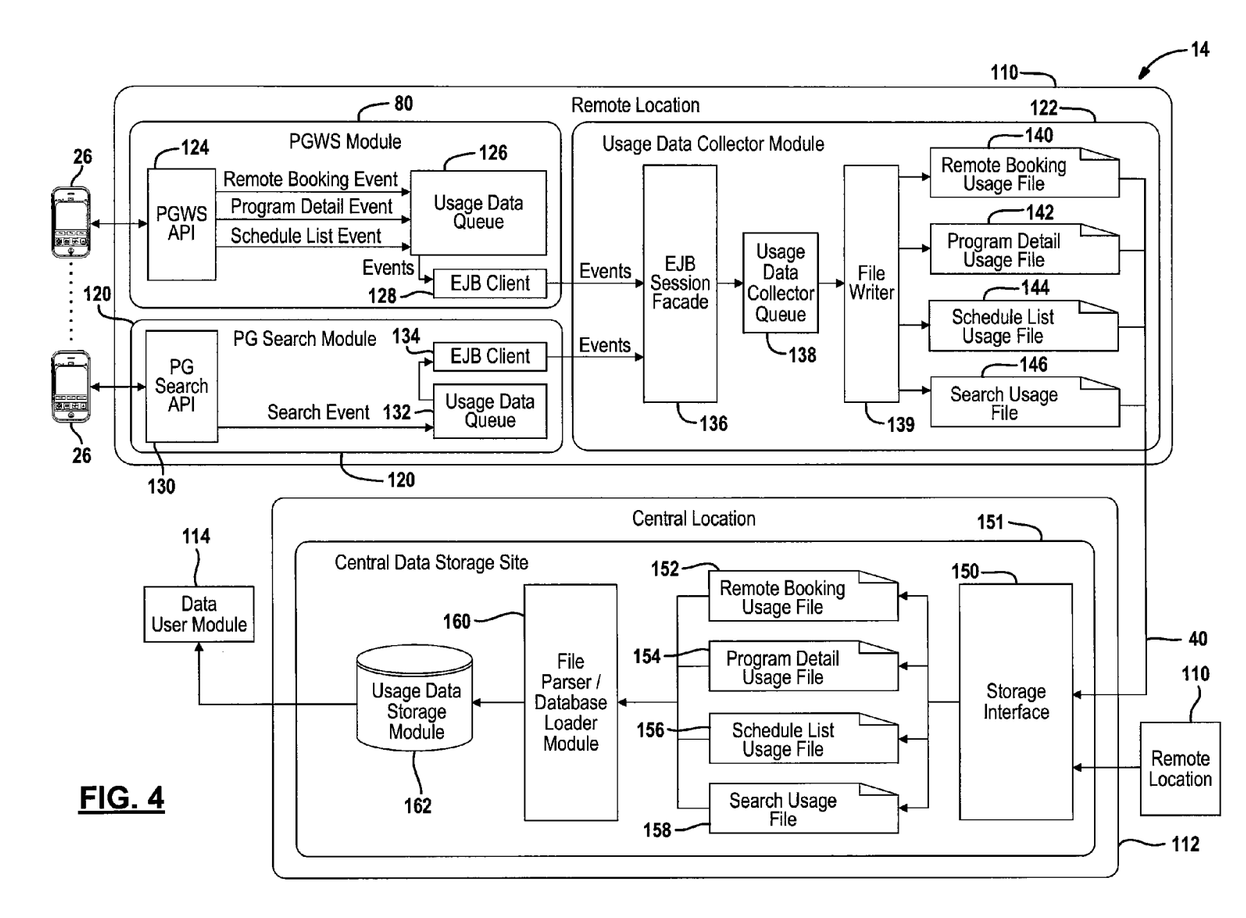
FIG. 4 is a block diagrammatic view of a first embodiment of the present system including a remote location and a central location.

Referring now to FIG. 4, the primary service provider 14 is illustrated in further detail. The primary service provider may be geographically distributed. A plurality of user devices 26 are illustrated in communication with the remote location 110 of the primary service provider 14. The remote location 110 is in communication with a central location 112 of the primary service provider. The remote location 110 is separated geographically from the central location 112. In FIG. 4, a second remote location 110 is also illustrated. However, in an actual implementation, a plurality of remote locations 110 may be implemented that are in communication with the central location 112.

At a high level, the remote location 110 receives action signals from the user devices 26. The action signals, as mentioned above, may be various types of signals requesting various types of data or content. The user devices 26 generate action signals that include various types of data therewith. The data is usage data that is ultimately communicated from the remote location 110 to the central location 112. The central location 112 may be in communication with various data user module 114. The data user module 114 may include searching algorithms, requests for services, guide data compilers, and system operators that use the data for troubleshooting.

The remote location 110 may include various modules depending upon the type of services performed. In this example, the program guide web service module 80 and a program guide search module 120 is illustrated. The program guide web service module 80 and the program guide search module 120 may be in communication with a usage data collector module 122. The modules 80 may perform the function of obtaining desired data or content from the primary service module. As various users use the different services of the program guide web service module 80 and the program guide search module 120, usage data is collected and communicated to the usage data collector module 122. Ultimately, the usage data collector module 122 communicates the usage data to the central location 112. The usage data collector module 122 may format the usage data into usage files as will be described below.

The user devices 26 may be in communication with a program guide web service application interface (API) 124. The application interface 124 may receive various action signals including a remote booking action signal, a program detail action event, a schedule list event, an authorization request and other types of events associates with the program guide or primary service provider. The action signals include various types of data including identifiers of the mobile device and the content searched or desired. The data associated with the action signal is stored within a usage data queue 126. The usage data queue 126 may be collected from various remote users and communicated to the usage data collector module 122 in a batch file. The batch file may be data combined together from different user devices.

In the following example, the program guide web service module 80 makes an EJB client call to the EJB remote interface of the usage data collector 122. An enterprise JAVA bean (EJB) client 128 may be used to communicate various usage data signals from the usage data queue 126 to the usage data collector 122. Various usage data queue signals may be communicated in batch events to the usage data collector 122. By communicating the usage data in batch events, the program guide web service module 80 is not slowed down in the providing of program guide data to the various users. It should be noted that throughout this document JAVA is used as one example of a programming language.

The program guide search module 120 may include a program guide search application interface (API) 130. The API 130 is in communication with a usage data queue 132. The usage data queue 132 may also be in communication with an enterprise JAVA bean client 134. The enterprise JAVA bean client 134 may act in a similar manner to those described above.

The APIs 124 and 130 obtain data or content from the various modules of the primary service provider 14 illustrated in FIG. 3. Actual components of FIG. 3 may be located in the remote location or central location so a physical interconnection is not illustrated in FIG. 4.

The enterprise JAVA bean client 128, 134 may communicate groups of data from various users to an enterprise JAVA bean session façade 136 within the usage data collector 122. The usage data collector may have a usage data collector queue 138 that is used for receiving the data from the various modules. The usage data collector queue 138 is in communication with a file writer 139. The file writer 139 may write different types of files depending upon the type of data. For example, a remote booking usage file 140 may be generated based upon the remote booking data received from the remote booking action signal. A program detail usage file 142 may be generated from a program detail action signal. A schedule list usage file 144 may be generated from a schedule list action signal. A search usage file 146 may be generated from a search action signal.

The various files generated in the usage data collector module 122 may be communicated to a storage interface 150 of a central data storage site 151 through the network 40. The storage interface 150 of the central data storage site 151 may have a file transfer protocol (FTP) associated therewith. The storage interface may be a snap mirror in which data on one system is replicated in the other. The storage interface 150 may separate out the various usage files described above. In this manner, the remote booking usage file 152, the program detail usage file 154, the schedule list usage file 156 and the search usage file 158 may be separated from the receive data. A file parser and database loader module 160 may receive the usage files and store the usage files in a storage device 162. The usage data module 162 may be a database. Various data may be gathered or separated in the file parser. For example, specific user information may be generated as well as aggregated usage for various users. As will be described below, the various data user module 114 may retrieve the usage data from the usage data module 162 to change or affect various data within the system. For example, the data user module may adjust the search results based on searches performed at the user devices 26. Further, the data user module may perform troubleshooting of the system-based signals received. For example, when signals are received from a remote location, an equipment error may be present.

It should be noted that, although various usage files are illustrated by way of example, various other types of usage data depending upon the various module functions at the remote location may be generated.

Figure 5:
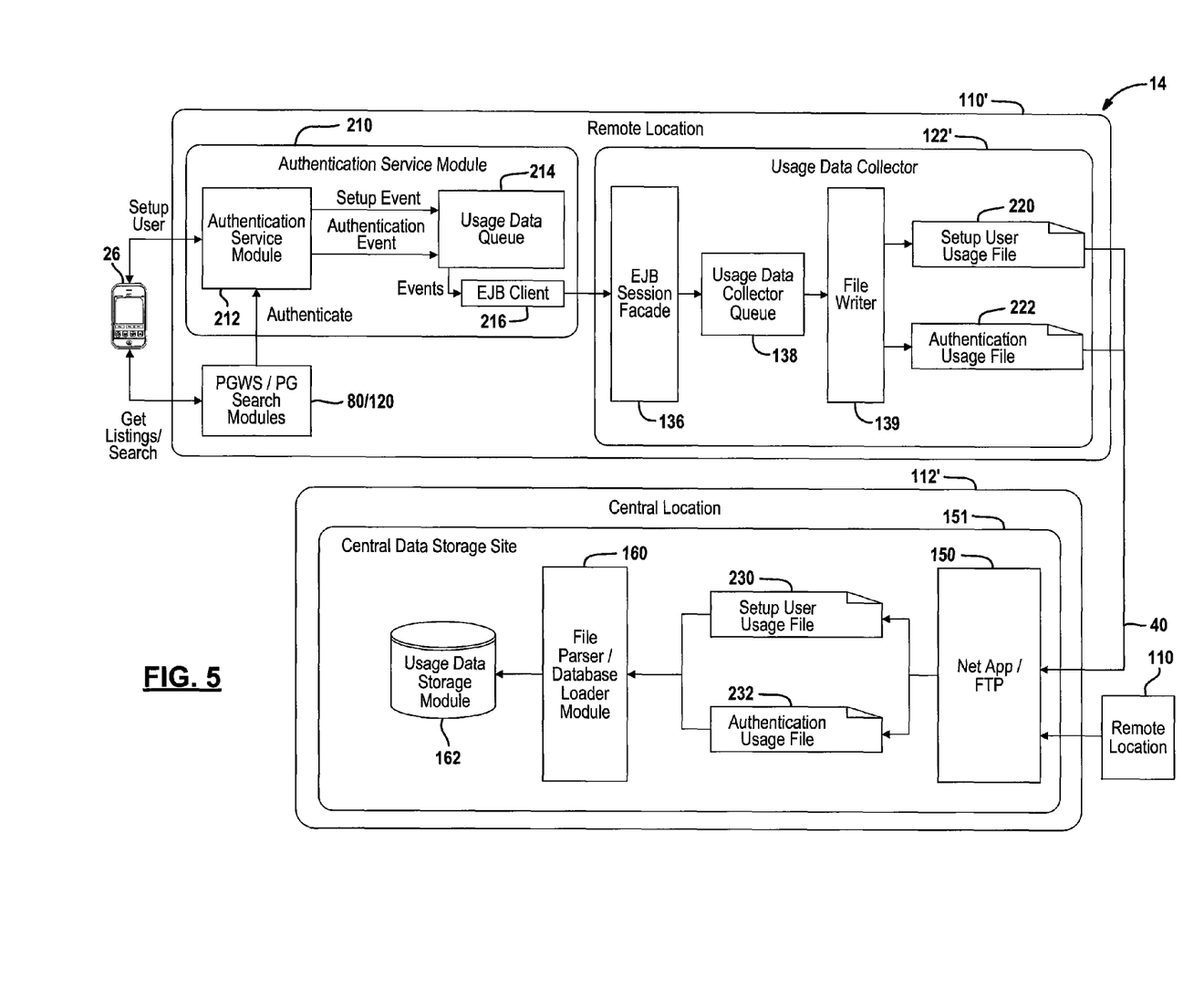
FIG. 5 is a second embodiment of the present system including a remote location and a central location.

Referring now to FIG. 5, a remote location 110' is illustrated in communication with a central location 112'. In this example, the user device 26 is in communication with an authentication service module 220. The authentication service module 220 may generate a set-up event signal and an authentication event signal. The set-up event signal and authentication event signal may be communicated to a usage data queue 212 and an enterprise JAVA bean client 214. The data queue 212 and the client 214 act in a similar manner to those described above. However, the mobile device may try communicating to a particular service module such as the program guide web service module 80 and the program search module 120. In order to retrieve data from either service, authentication may take place using the authentication service module 210. Thus, an authentication signal may be generated at the program guide web service module 80 or the program search module 120 when such access is desired by the user 26.

The usage data collector 122' is provided having an EJB session façade 136 and usage data collector 138 that act in the same manner as that described above in FIG. 4. Likewise, a file writer 139 also acts in a similar manner but writes different types of files based upon the different module 210. In this example, a set-up user usage file 220 and an authentication usage file 222 are generated.

The central location 112 is also configured in a similar manner to that described above. Thus, the same reference numerals are provided with the same component. In this example, the set-up user usage files 230 and the authentication usage files 232 are generated from the storage interface 150. The data associated with these files is ultimately stored in the usage data storage module 162.

Figure 6:
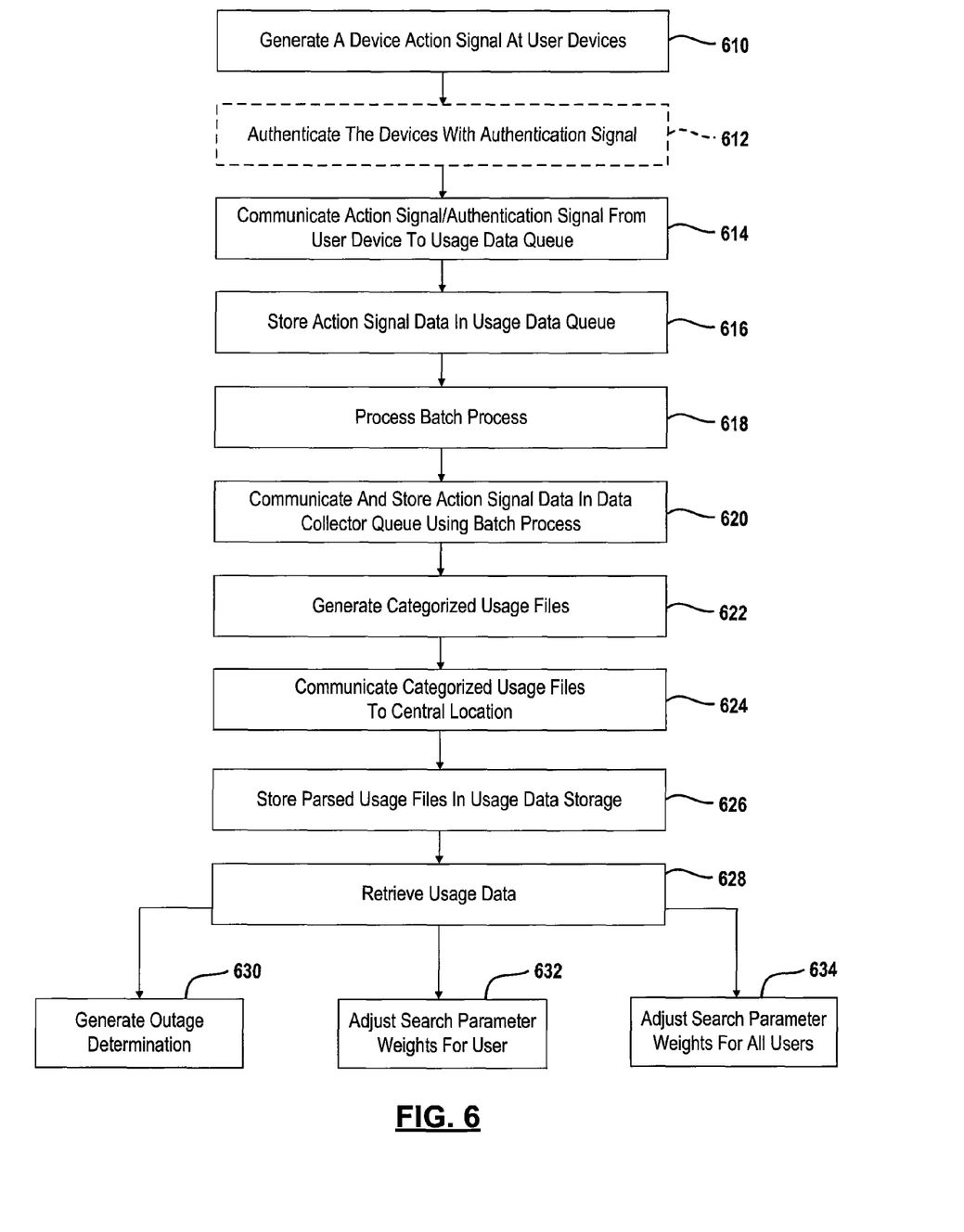
FIG. 6 is a flowchart of a method for operating the communication system.

Referring now to FIG. 6, the method of operating the communication system is set forth. In step 610, a device action signal is generated at a user device. The user device may include both fixed and mobile user devices. In step 610, an authentication signal may be generated from the module at the remote location so that authentication of the user device may take place. The authentication signal may be generated by the initial contact module and authentication may be provided from a central location or another part of the primary service module 14.

In step 614, the action signal or authentication signal may be communicated from the user device to the usage data queue. The usage data is stored and provided in batch events to the usage data collector as described above. In step 616, the action signal data is stored in a data queue. In step 618, a batch job or a batch process may be performed so that the various data events stored within the usage data queue are processed. In step 620, the data may be communicated and stored in a usage data collector queue at the usage data collector illustrated in FIGS. 4 and 5.

In step 622, various usage files may be generated based upon the data within the usage data collector queue. The usage files generated may depend upon the various types of data collected. The usage data files may include, but are not limited to, set-up user usage files, authentication usage files, remote booking usage files, program detail usage files, schedule list usage files, and search usage files as described above. Further, other types of usage files may be generated based upon the type of modules that the user device interfaces with. The categorized usage files are communicated to the central location in step 624. In step 626, the various types of data files may be stored within a usage data storage module. Prior to storing, however, the usage files may be parsed and categorized. General user information may be stored as well as individual user information.

In step 628, various systems that require usage data may retrieve the usage data. In step 630, outage determinations may be made from the received data so that technical adjustments may be made. For example, when a particular event such as a football game is being broadcasted, various amounts of usage data can be forecasted to be requested by various users. When a particular area of the country is not requesting user data through the various modules, an outage or equipment failure may have occurred at the remote location or one of the modules therein. A lack of use may be an indicator of outage of a particular remote location or the components within a remote location. In step 632, the search parameters may be adjusted based upon weights. That is, search results may be weighted based on various factors. The factors may be adjusted in response to user data. For example, if a particular topic or search is popular at a particular time, search results may be weighted based upon the usage data. The search weights may be adjusted based on past searches for a particular user.

In step 634, the usage data may also be used to adjust the search parameter weights for all users rather than just for a single user. Aggregated user data may provide an indication of the popularity of certain search results. Single-user weights in step 632 may adjust the weights for a particular user based upon location or other parameters. All user data in step 634 may be adjusted based upon the popularity of various types of searches. By weighting the searches, more relevant data may be provided when a search is requested from a user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   generating a first device action signal at a first user device having first device usage data associated therewith;
   generating a second device action signal at a second user device having second device usage data associated therewith;
   communicating the first device usage data and the second device usage data to a usage data queue;
   storing the first device usage data and the second device usage data in the usage data queue;
   forming a batch file comprising the first device usage data and second device usage data;
   thereafter, communicating the batch file to a usage data collector located remotely from the usage data queue; and
   communicating the first device usage data and the second device usage data to a central data storage site from the usage data collector in a plurality of files.

2. A method as recited in claim 1 wherein generating the first device action signal comprises generating the first device action signal that comprises at least one of a content request, a remote booking request, a setup request, a data request or an authentication request.

3. A method as recited in claim 1 wherein generating the second device action signal comprises generating the second device action signal that comprises at least one of a content request, a remote booking request, a setup request, a data request or an authentication request.

4. A method as recited in claim 1 wherein generating the first device action signal comprises generating a site identifier and a user device identifier.

5. A method as recited in claim 1 wherein communicating the first device usage data and the second device usage data to a usage data queue comprises communicating the first device usage data and the second device usage data to the usage data queue in a first module.

6. A method as recited in claim 1 wherein communicating the first device usage data and the second device usage data to a usage data queue comprises communicating the first device usage data and the second device usage data to the usage data queue in a search module.

7. A method as recited in claim 1 wherein communicating the first device usage data and the second device usage data to a usage data queue comprises communicating the first device usage data and the second device usage data to the usage data queue in a program guide module.

8. A method as recited in claim 1 wherein after communicating the first device usage data and the second device usage data to a central data storage site from the usage data collector, changing search results based on at least one of the first device usage data or the second device usage data.

9. A method as recited in claim 1 wherein communicating the first device usage data and the second device usage data to a central data storage site from the usage data collector comprises communicating the first device usage data and the second device usage data to the central data storage site from a remote location located geographically remote from the central data storage.

10. A method as recited in claim 1 wherein communicating the first device usage data and the second device usage data to a central data storage site from the usage data collector comprises communicating the first device usage data and the second device usage data to the central data storage site from a plurality of remote locations located geographically remote from the central data storage.

11. A method as recited in claim 1 wherein after communicating the first device usage data and the second device usage data to a central data storage site from the usage data collector, determining equipment outage based on at least one of the first device usage data or the second device usage data.

12. A system in communication with a first user device and a second user device comprising:
   a first module receiving a first device action signal from the first user device having first device usage data associated therewith, receiving a second device action signal from the second user device having second device usage data associated therewith and storing the first device usage data and the second device usage data in the usage queue, said first module forming a batch file from the first device usage data and the second device usage data;
   a usage data collector located remotely from the usage queue in communication with the first module receiving the first device usage data and the second device usage data in the batch file from the usage queue; and
   a central data storage site receiving the first device usage data and the second device usage data from the usage data collector in a plurality of files.

13. A system as recited in claim 12 wherein the first device action signal comprises at least one of a content request, a remote booking request, a setup request, a data request or an authentication request.

14. A system as recited in claim 12 wherein the second device action signal comprises at least one of a content request, a remote booking request, a setup request, a data request or an authentication request.

15. A system as recited in claim 12 wherein the first device action signal comprises a site identifier and a user device identifier.

16. A system as recited in claim 12 wherein the first module comprises a search module.

17. A system as recited in claim 12 wherein the first module comprises a program guide module.

18. A system as recited in claim 12 further comprising a file writer within the usage data collector generating the plurality of files, said usage data collector communicating the plurality of files to the central data storage site.

19. A system as recited in claim 12 further comprising a data user module in communication with the central data storage site changing search results based on at least one of the first device usage data or the second device usage data.

20. A system as recited in claim 12 wherein the first module and the usage data collector are disposed in a remote location located geographically remote from the central data storage.

21. A system as recited in claim 12 further comprising a plurality of remote locations communicating usage data to the central data storage site.

22. A system as recited in claim 12 further comprising a data user module in communication with the central data storage site determining an equipment outage based on at least one of the first device usage data or the second device usage data.

* * * * *